May 30, 1933. G. C. MARTIN 1,911,764
ORTHOPEDIC DEVICE
Filed Jan. 19, 1931
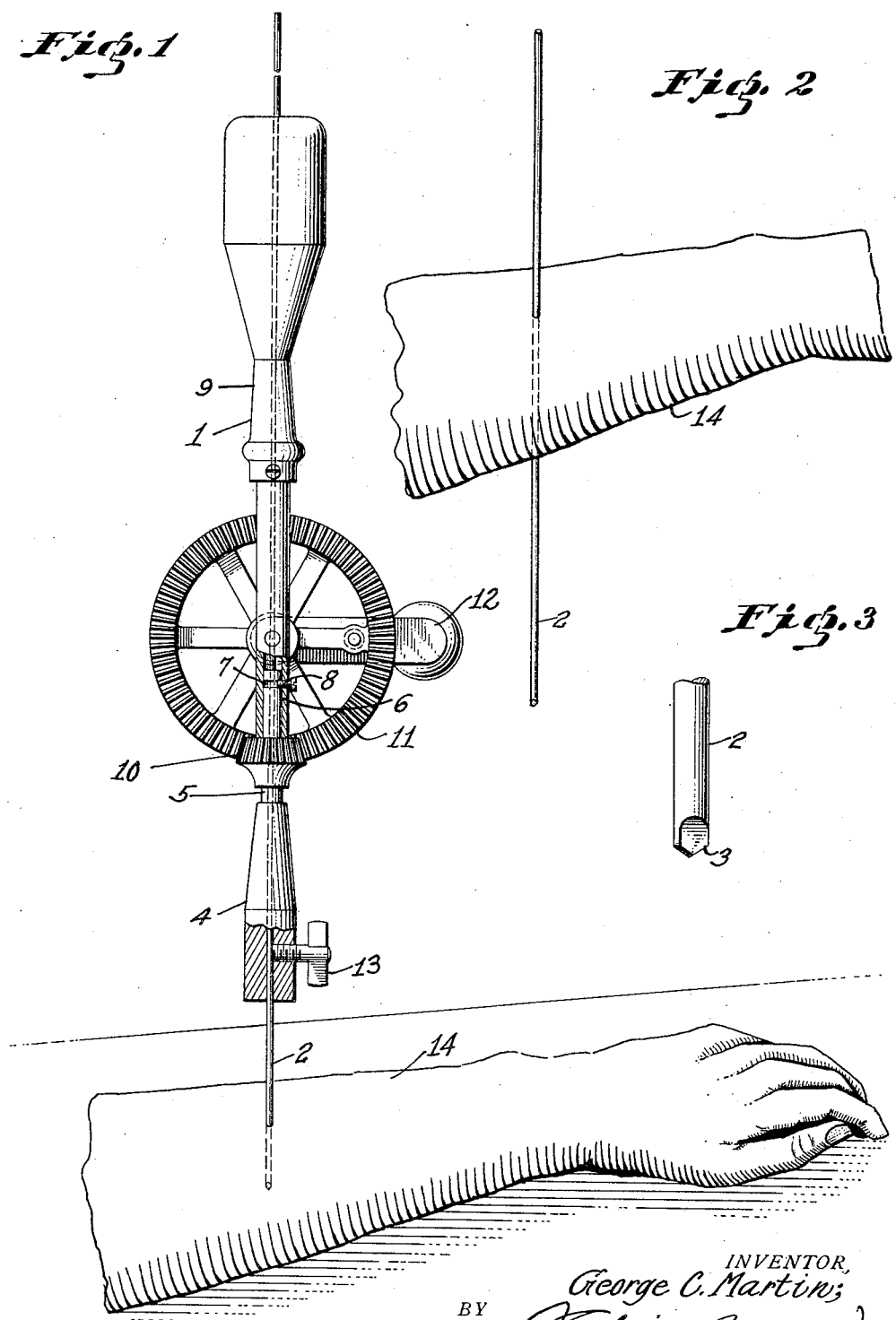

Patented May 30, 1933

1,911,764

UNITED STATES PATENT OFFICE

GEORGE C. MARTIN, OF LOS ANGELES, CALIFORNIA, ASSIGNOR TO SAMUEL S. MATHEWS, OF LOS ANGELES, CALIFORNIA

ORTHOPEDIC DEVICE

Application filed January 19, 1931. Serial No. 509,763.

This invention relates to orthopedic or surgical devices, and has for an object the provision of a device wherein the setting of bones resultant upon fracture thereof is conveniently and accurately accomplished.

Another object is the provision of an orthopedic or surgical device so arranged and constituted as to permit a surgeon to control a drill with accuracy as to the zone of the bone being drilled through.

Another object is the provision of an orthopedic or surgical device adapted to produce superior results for the purpose intended over aparatus now generally employed by surgeons so far as the inventor is aware.

At the present time, it is customary to utilize a brace adapted to carry a long drill or bit. As a rule, this drill or bit is fairly large in diameter and measures from 7 to 12 inches in length. It will immediately be seen that the handling of a device of this character in the drilling of a bone is in and of itself a feat. As a consequence, it is difficult for the surgeon to accurately determine the position of the drill relative to the bone as the drill point may slip from one side of the bone and the drilling of the bone through the middle thereof is more luck than skill. As a consequence, the surgeon utilizes a long tube which surrounds the drill and this tube is utilized for the purpose of guiding the drill. However, this requires two surgeons to operate and if one surgeon holds the tube, it is impossible for the other surgeon to determine where the drill point is operating relative to the bone. Of course, an X-ray can be taken but it is not always possible to continue the use of an X-ray during a drilling operation.

The present invention has for a further object the provision of means adapted to overcome the objections above set forth, so that the surgeon without the aid of an assistant can at all times guide movement of the drill in its passage through the bone.

Other objects will appear as the description of the invention proceeds, and with the above mentioned and other objects in view, the invention consists in the novel and useful provision, formation, construction, association, and relative arrangement of parts, members and features, all as illustrated in a certain embodiment in the accompanying drawing, described generally, and more particularly pointed out in the claims.

In the drawing:

Figure 1 is an elevation of one form of the invention shown in the act of drilling a bone, Figure 2 is a fragmentary elevation showing the bit or drill extended through the arm and the bone, and, Figure 3 is a fragmentary elevation of the drill head.

Referring to the drawing, I have shown a brace 1 adapted to carry a drill or bit 2. This drill or bit, in the present instance, comprises an elongated member provided with a drill head 3. For the purpose of illustration only, I may state that a piano wire may be used for the drill after it has been provided with a drill head. The brace itself may take any form. However, in the present instance, the form shown in Figure 1 has given superior results. This brace includes a chuck 4, to which is secured a shaft 5, said shaft being rotatably received within a hollow stem 6 and held within said stem in any convenient manner, such as by forming the stem with an annular groove 7, within which groove is received a screw 8, the said screw being carried by the stem. Secured to the stem is a handle 9. The chuck 4, the shaft 5, and handle 9 are all provided with longitudinal bores and when the brace is assembled are in alignment.

The shaft 5 carries a bevel gear 10 adapted to mesh with a further bevel gear 11. The bevel gear 11 is mounted for rotation upon the stem 6 and said gear may be rotated through the medium of a crank 12.

The drill 2, as before stated, includes an elongated member which may measure from 6 to 12 inches or more in length, and is of small diameter. This drill is adapted to be passed through the longitudinal bores of the chuck, stem and handle, as illustrated in Figure 1. A screw 13 adjustably secures the drill 2 relative to the chuck. Obviously the degree of projection of the drill beyond the chuck may be regulated by this screw 13.

The operation, uses and advantages of the invention just described are as follows:

At 14, I have shown in fragment a human arm, and it is to be supposed that the bone of the arm has been fractured. This fracture may be of any form, such as the overriding type or spiral type. The surgeon desiring to reset the bone must have some means whereby he can control movement of the bone. Therefore, he releases the screw 13 and projects the drill which is passed entirely through the brace so that the drill head projects perhaps an inch beyond the chuck, whereupon the screw 13 is tightened. The drill head is then pressed against the flesh, and in some instances the drill may be pushed through the flesh or the drill may be rotated through the medium of the gears. The surgeon, upon reaching the bony structure, can by sense of touch accurately determine the position of the drill head relative to the bone by sliding the drill head back and forth relative to the bone. Having determined the proper position, he may have the chuck quite reasonably close to the fleshy material to assure that the drill head does not slip during a drilling operation and, having punctured the bone a slight amount, he may then release the screw 13 and regulate the extension of the drill relative to the chuck, after which the screw is tightened and the drilling continued until the drill has been passed entirely through the bone and the arm, substantially as shown in Figure 2. Of course, after the drill head has emerged from the opposite side of the flesh, the brace may be released from the drill and the drill pulled through to the position shown.

In an application filed contemporaneously with this application, and also for orthopedic or surgical devices, Serial No. 509,764, I have described mechanism adapted to be utilized in conjunction with the drill after the bone has been drilled, and the drill is in the position shown in Figure 2. This latter invention contemplates a device adapted to place the drill under tension and so that the surgeon may, by grasping said device, be able to move the bone through the medium of the drill to reset the same. The drill is left within the bone, or may be withdrawn therefrom, at the option of the surgeon. In any event, after the bone has been set, the arm, if it happens to be a fractured bone of the arm that has been set, is placed within a cast. However, in certain instances, the drill may be left in the arm and through the medium of the device described in my copending application referred to, apply a pressure to the bone through the drill so that the muscles of the arm are relieved of work. It will be readily understood by even the layman that it is the muscles that tend to hold the bone in place, and where both the muscles and the nerve fibres and tendons, and the like, have been injured by the fracture, this only imposes a further amount or work upon the muscles, tendons and fibres and lengthens time of the consequent healing operation. With my invention, it is possible to shorten the actual time within which healing will take place and lessen discomfiture of the patient.

As before stated, I have found that piano wire when provided with a drill head, performs the function required of the invention in an admirable manner. I, therefore, believe that my invention is novel in certain particulars, to-wit, the provision of a brace adapted to accommodate an elongated drill so that the drill may be fed progressively from the chuck during a drilling operation; also in the provision of a brace of the character stated wherein the drill passes entirely through the brace and capable of extending both beyond the handle and the chuck; also a drill formed of wire.

It is obvious that various changes and modifications and variations may be made in practising the invention and in the therapy practised without, however, departing from the true spirit of the invention as described and set forth within the scope of the appended claims.

I claim:

1. An orthopedic or surgical brace including a chuck formed with a central drill receiving bore, a handle in longitudinal alignment with said chuck and formed with a bore in alignment with the bore of the chuck, and whereby any drill within said chuck may likewise extend through the bore of the handle.

2. An orthopedic or surgical brace including a chuck formed with a central drill receiving bore, a handle in longitudinal alignment with said chuck and formed with a bore in alignment with the bore of the chuck, whereby any drill within said chuck may likewise extend through the bore of the handle, and means for rotating the chuck.

In testimony whereof, I have signed my name to this specification at Los Angeles, California, this 8th day of Januaray, 1931.

GEORGE C. MARTIN.